July 7, 1970 J. R. SHARP 3,519,423
METHOD OF MAKING MULTICOLORED SCREENS
Filed Oct. 24, 1966
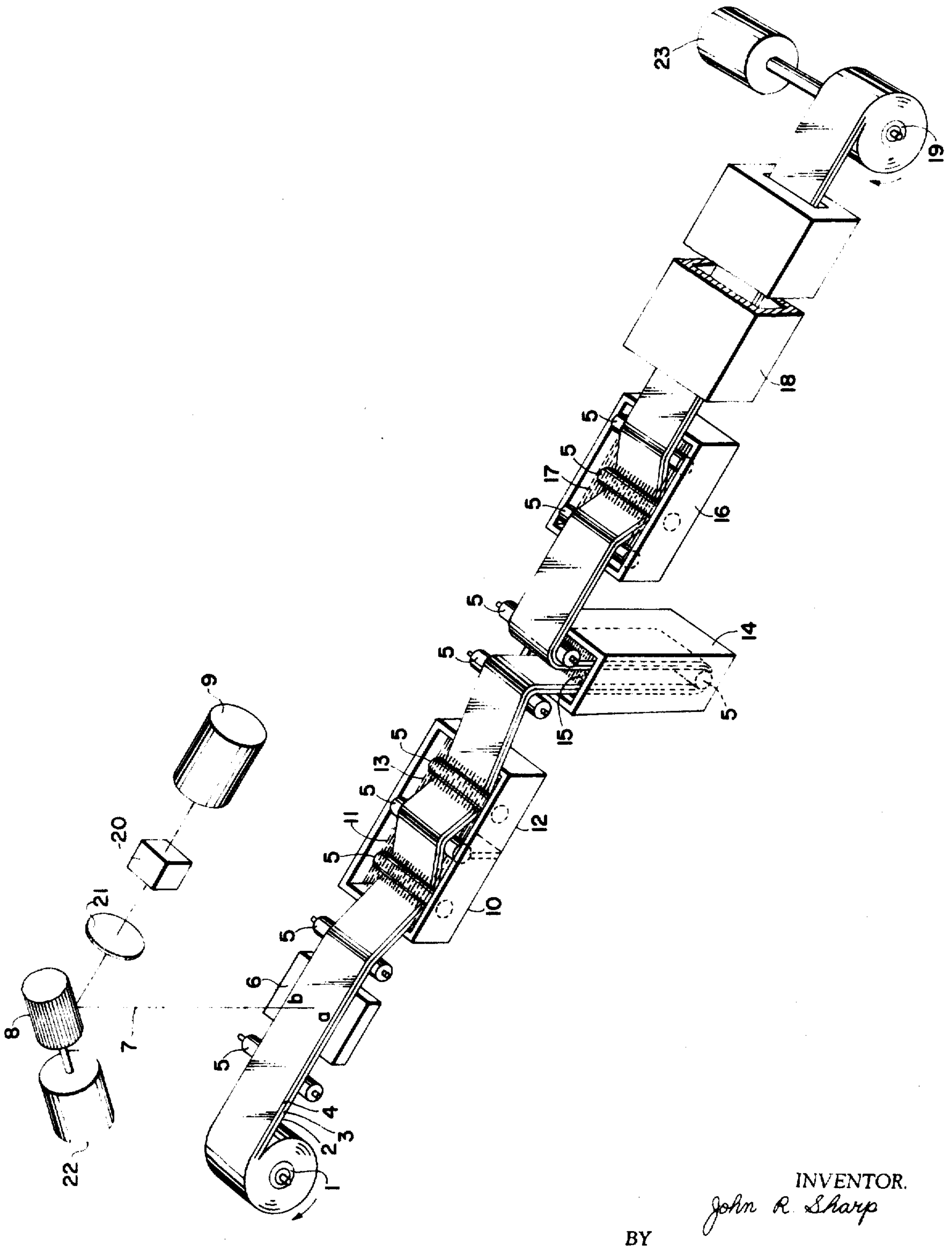
INVENTOR.
John R. Sharp
BY
Brown and Mikulka
ATTORNEYS United States Patent Office 3,519,423
Patented July 7, 1970

3,519,423

METHOD OF MAKING MULTICOLORED SCREENS

John R. Sharp, North Quincy, Mass., assignor to Polaroid Corporation, Cambridge, Mass., a corporation of Delaware Filed Oct. 24, 1966, Ser. No. 588,784
Int. Cl. G03c *1/48*; G03f *5/00*
U.S. Cl. 96—76 21 Claims

ABSTRACT OF THE DISCLOSURE

Multicolor screens comprising a plurality of chromatic filter elements may be prepared by selectively exposing an element comprising a plurality of photosensitive layers to a beam of radiation actinic to at least one of said layers by periodically traversing said layer with said beam to provide a plurality of exposed areas separated from and substantially parallel to one another.

This invention relates to photography, and more particularly, to photomechanical processes adapted for the production of specified color screen elements.

In general, color screen elements comprise a screen pattern formed of a plurality of light-filtering, colored elements which are each of an independent color and which are generally classifiable into different groups in accordance with the colors thereof. Thus, a conventional three-color additive screen generally has a set or group of primary red-colored filter elements, a set of primary blue-colored filter elements and a set of primary green-colored filter elements. These filter elements are ordinarily arranged in a mosaic or geometrical pattern in a random or regular distribution.

The production of color screen elements, in accordance with the prior art, may be classified into two major groups.

First, color screen elements may be prepared by totally mechanical means, as for example, by printing or ruling a dyeable substrate, for example, with a greasy ink formulation, in accordance with the desired filter pattern; subjecting the substrate to suitable coloration, in areas which do not possess the repellant ink mask; effecting removal of the mask; and repeating this procedure, in accordance with the geometrical pattern of filter elements desired, a sufficient number of times to provide the desired multiplicity of diversely colored filter elements.

A second mechanical method comprises directly printing a carrier substrate with the desired dye formulations in accordance with the predetermined filter pattern and repeating this printing procedure a sufficient number of times to provide the multiplicity of colored filter elements desired.

A third mechanical method comprises depositing, as an irregular filter screen pattern, a thin layer comprising a random distribution of small grains, such as starch grains, which have been independently colored with the colors desired for optical filtering effects.

The second major type of color screen production procedures comprises photomechanical methods of the type proposed by, for example, Ducos Du Hauron in the nineteenth century. These procedures comprise, in general, coating a suitable support or film base with an adhesive composition having coated thereon a photosensitive colload composition, as for example, dichromated gelatin; effecting exposure of the sensitive gelatin layer by incident actinic radiation, through a suitable mask which provides an exposure pattern devised in accordance with the desired optical filter element arrangement; effecting differential hardening of the sensitized colloid as a function of the point-to-point degree of exposure; removing unexposed unhardened gelatin by solvent contact; and then subjecting the remaining hardened colloid to a suitable dyeing procedure in order to provide a first-colored optical filter element series. This procedure is then repeated, employing appropriate masks, as often as necessary to provide the number of optical filter element types desired in the final color screen element.

The preceding mechanical methods of producing color screen elements by mechanical printing or ruling methods inherently require a great number of mechanically exact printing steps to provide a finished product, and thus possess the relative high cost inevitable to such complexity of production. Because of the extreme difficulties of manufacture, and of the relative costs in general, production of color screen elements by means of these processes has been extremely limited. Only the so-called Dufay process has had an extended production duration, but, nevertheless, only a relatively limited market.

Methods of mechanically producing mosaic type color screen elements have, in general, provided elements inherently lacking in color balance, due to areas possessing a predominance of particles of one color, as a practical result of attempted random distribution. This problem of statistical clumping requires the employment of extremely fine colored grains in order that formation of random aggregates of the same color may be decreased. Attempts to avoid the problem of aggregates by this latter mechanism, however, gives rise to the additional disadvantage that the thus-prepared units then require very fine grain photographic emulsions, when employed as a component of a photographic film unit, and are thereby restricted to employment in low speed photographic processes. Furthermore, due to the necessary increase of interfaces between filter elements per unit area, color saturation is extensively decreased. Experience has also shown that attemps to prevent overlapping of respective filter units, in this system, and to correct for the lack of true juxtaposition between respective filters have been, at best, inadequate to provide color filter screens of sufficient optical acuity to attain the desired commercial significance. The only commercial process of this type having extended duration produced the so-called Autochrome plate of Lumiere. This plate comprised a mosaic of red, green and blue starch grains which were allowed to settle onto a tacky glass surface and then flattened out into tiny filter elements, each about 0.015 millimeter in diameter.

Although initially proposed almost a century ago, photomechanical methods of preparing color screen elements have singularly failed to attain commercial significance. This has been true irrespective of the fact that extensive research on such systems has been carried out during the intervening time interval.

One basic problem with regard to photomechanical systems has been encountered in producing filter elements having the physical parameters, for example, structure and color intensity, necessary to provide a commercially acceptable product.

A second, related, basic problem has been to insure that individual photosensitive areas, ultimately forming the optical filter units, are accurately subjected to substantially complete photoexposure throughout their total prescribed area, and that any optical defects, for example, parallax, resultant from the exposure source, be maintained at such a minimum level as to provide optical filter element boundary areas with the requisite integrity.

A third, related, problem has been to design apparatus which alleviates the first two problems by such means as will allow, in a practical manner, the continuous manufacture of color screens in sufficient quantity and with sufficient quality to attain true commercial significance.

Accordingly, it is a principal object of the present invention to provide processes particularly adapted for the photomechanical production of a color screen.

An additional object of the invention is to provide a method for making color screens of the above-described character having a plurality of sets or series of colored optical filter elements providing a screen pattern with the elements of each set being of the same color, hence possessing the same chromatic filtering properties, but different in color from the elements in any other set, by practices which reduce the processing steps heretofore required to produce such screens and which provide products of good quality at great simplicity and consequent low cost.

A further object of the invention is to provide a method by which the relative number, surface area, thickness, and color intensity of individual color elements comprising the color screen may be varied from screen to screen without the necessity of complicated changes in the manufacturing apparatus between the manufacture of successive screens.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawing wherein:

The figure is a diagrammatic perspective view of an apparatus illustrating performance of the process practiced in accordance with the present invention.

It has now been discovered that color screen elements exhibiting a high degree of optical acuity and particularly adapted for use in photographic processes, of both the conventional and diffusion transfer type, particularly additive multicolor photographic processes, may be expeditiously prepared, in general, by coating, on a surface of a support, a plurality of photoresponsive layers. Each photoresponsive layer is selectively exposed to electromagnetic radiation actinic to the layer in order to provide to the layer a plurality of discrete exposed areas, in screen relationship, and at least one of the plurality of photoresponsive layers is exposed by periodically traversing such layer, in a substantially parallel relationship, with a beam of electromagnetic radiation actinic to such layer, to provide a desired plurality of exposed areas of that layer separated from and extending substantially parallel to each other. Each photoexposed layer is dyed as a function of its point-to-point degree of exposure to provide a series of chromatic filter elements particularly adapted to filter selected, or predetermined, wavelengths of incident electromagnetic radiation in accordance with its radiation absorbability.

In a preferred embodiment of the present invention, a transparent support member, most preferably a flexible transparent polymeric web material, is successively coated with photoresponsive layers particularly adapted to provide for the formation of a photoresist, as a function of exposure to electromagnetic radiation actinic to the layers, as for example, potassium, sodium, or ammonium dichromate sensitized gelatin, or photosensitized albumin, casein, gum arabic, polyvinyl alcohol, or any other photoresist-forming, radiation-sensitive polymers known in the art as adapted for employment for the production of resists by photomechanical means. Prior to the coating of the next succeeding photoresponsive layer, each preceding layer is selectively exposed, as detailed hereinafter, to radiation actinic to such layer in order to provide a plurality of discrete exposed areas to the layer. The unexposed portions of the layer are then removed by contact with a solvent for same, e.g., water, and the remaining areas, now constituting a resist, are dyed a selected color thereby providing a series of chromatic optical filter elements adapted to filter selected wavelengths of incident electromagnetic radiation.

In the preferred embodiment described above, exposure of the photoresponsive layer next contiguous the support is accomplished by periodically traversing or scanning such layer, directly or less preferably through the transparent base, in a substantially parallel relationship, with a beam of actinic radiation, to provide the desired plurality of exposed areas to that layer separated from and extending substantially parallel to each other. Exposure of the second and succeeding layers may then be accomplished by periodically scanning such layers successively, directly or more preferably through the transparent base whereby the previously-formed optical filter elements may operate as a mask, in a substantially parallel relationship to, in sequence with, and displaced from the optical elements comprising the first-formed and each successive chromatic filter element series, to provide the desired number of series in side-by-side screen relationship. Most preferably, however, the second and succeeding layers, except for the terminal layer, are exposed by periodically scanning such layers successively through the transparent support at an angle to the longitudinal axes of the previously-formed filter elements and, where the preferred trichromatic color screen is produced, the second exposure will most preferably be accomplished by periodically scanning the second layer at about a 90° angle to the longitudinal axis of the first-formed filter elements. The terminal exposure in the preferred embodiments is accomplished by diffuse radiation traversing through the transparent support and exposing the terminal photoresponsive layer as masked by the previously-formed optical filter elements.

Alternatively, a plurality of photoresponsive layers sensitive to separate or different regions of the electromagnetic radiation spectrum, as further detailed hereinafter, may be successively or simultaneously coated on a support or a web and may then be successively or simultaneously exposed by periodically scanning, in parallel relationship as described above, each layer with a separate beam of radiation actinic to such layer. The exposed layers may then be dyed their selected colors, simultaneously or sequentially, as a function of the point-to-point degree of their respective exposures. For example, a multilayered element comprising a plurality of the hereinafter described silver halide emulsions, preferably at least two of said emulsions in laminate form, may be fabricated as an element wherein any one or more of the respective emulsions is optically (spectrally) sensitized, according to the procedure described hereinafter, to electromagnetic radiation of selected wavelengths differing from any one or more of the remaining emulsion units, that is, having predominant spectral sensitivity to separate regions of the electromagnetic spectrum, for example, one or more emulsion units sensitized to the red region of the visible spectrum, one or more emulsion units sensitized to the green region of the visible spectrum, one or more emulsion units sensitized to the blue area of the visible spectrum, and the like. The respective differentially sensitized emulsion components may then be simultaneously and/or sequentially exposed to the selected radiation pattern, corresponding to the particular configuration desired, at the particular radiation wavelengths to which the selected emulsion component desired to be exposed is responsive. The multilayered element then containing the selected plurality of latent images may be sequentially or simultaneously developed according to known photographic techniques, for example, as described hereinafter, and the resultant screen element so provided.

In accordance with one procedure, color coupling techniques may be employed to provide the requisite registered color images forming the required chromatic filter elements. According to such techniques, one or more, generally gelatinous, selectively photoresponsive, silver halide strata containing the desired latent image definition are suitably, directly or reversibly, developed to color images, as a function of exposure, by selective intimate contact between one or more color developing agents and one or more color formers or couplers disposed in the respective strata to provide the requisite color image formation and definition.

In accordance with a second procedure, a preformed dye disposed in the respective strata may be selectively removed and/or bleached as a function of the point-to-point degree of exposure to provide the requisite chromatic filter element formation.

Thus, in accordance with the present invention, a method for manufacture of a color screen by selectively exposing to light a portion of a photoresponsive layer adjacent to a support base is provided whereby the exposure pattern is transformed into a screen pattern composed of two or more optical filter elements rendering a screen useful, for example, for photographic color processes and wherein exposure of the photoresponsive layer is carried out by a scanning technique employing a beam of finely focused radiation which forms the screen pattern, one element at a time. In the process of this invention a photoresponsive layer may be coated on a continuous transparent web base. The web is passed under a beam of finely concentrated light which periodically scans the width of the web as the web moves in the direction of its longitudinal axis; the period of and the rate of scan being controlled, for example, by the speed and dimensions of a rapidly rotating multifaceted reflecting means such as a mirror or prism upon which is focused the beam of radiation and which acts to sweep the beam across the web in syncronization with the transverse movement of the web. In this manner, an exposure pattern consisting of a series of very fine separate parallel lines is superimposed on the photoresponsive layer which may then be processed to produce a series of filter screen elements as detailed above.

Subsequent to formation of the first series of chromatic filter elements, second and succeeding series of filter elements may be provided by recoating the web with additional photoresponsive layers, and repetition of the scanning of the layers, preferably through the web in a direction either parallel and displaced from or at angles to the first set of elements, and processing the exposed coatings to completion. Alternatively, the terminal coating or second coating, if only a two-color screen is contemplated, may be given an overall or fill in exposure through the previously-formed filter elements.

It will be understood that the scanning procedure may be repeated as often a number of times as the number of chromatic filter elements desired, the final exposure preferably being the detailed masked overall exposure, and that the radiation source should preferably provide relatively intense focused actinic radiation and may be derived from such sources as electron beams, electromagnetic wave generators known by the acronym "laser" or the like radiators, and may include various intensifiers such as reflectors and the like as well as suitable modulating, focusing, and filtering devices.

A detailed description of a preferred embodiment for formation of a three-color screen follows.

Referring to the figure, there is shown a diagrammatic perspective view of an apparatus particularly adapted for selectively exposing and treating portions of a photoresponsive layer, in accordance with a preferred embodiment of the process comprising the present invention, to provide for the manufacture of a color screen element.

Here there is shown a freely rotatable, cylindrical web supply drum 1 supplying a continuous web 2 comprising a transparent film base 3, such as a cellulose derivative film base, for example, a cellulose triacetate film base, which may have subcoated thereon an adhesive lacquer layer, such as a nitrocellulose lacquer layer (not shown), which has overcoated thereon a selectively photoresponsive, preferably polymeric, layer 4, such as an approximately 4 micron (dry weight) thick potassium or ammonium dichromate sensitized photohardenable gelatin layer.

In carrying out the instant embodiment, web 2 passes over roll guides 5 and guide plate 6 where at the latter position it is photoexposed by a scanning beam 7, of electromagnetic radiation actinic to photoresponsive layer 4, periodically reflected on and across layer 4 by rotating multifacet mirror 8, emanating from source 9 which preferably comprises a device such as a laser and optional associated optics which, in combination, in turn produces a narrow beam 7 of actinic electromagnetic radiation. Guide rolls 5 may provide motive power to assist the substantially uniform movement of the web through the exposure area, the means to motivate these rollers in such instances, for example, motors, pulleys, gears, etc., not being shown as they would be obvious to one skilled in the art of mechanics.

Subsequent to photoexposure, web 2 may be processed by transporting it into a wash tank 10 wherein the photoexposed and thereby differentially hardened gelatin of photoresponsive layer 4 is contacted with agitated water 11, maintained at a temperature within the range of about 80 to 140° F., for a time interval of about 3 to 60 seconds, in order to effect removal of unexposed, and thus unhardened, gelatin, in accordance with the scanned exposure pattern.

Web 12 may then be transported into another wash tank 12 wherein the hardened gelatin grid is subjected to a current of water 13 flowing counter to the path of web transport, in order to remove any possible residual debris and unhardened gelatin.

Continuous web 2 may then be transported through a dye tank 14, containing dye solution 15 comprising a dye substantive to the gelatin grid, for example, a primary red color acid dye, in order to provide the desired coloration to the first-formed optical filter elements. The contact time between travelling web 2 and dye solution 15 generally should be of the order of about one minute, after which time, web 2 may be directed through another wash tank 16 containing cold water 17 in order to effect removal of any residual or excess dye.

Web 2 may then be dried by passage through a drying chamber 18, containing suitable air circulating mechanisms or radiant energy devices, such as infrared elements, adapted to effect drying of web 2. Subsequent to effecting drying of web 2, the same may be spooled on a cylindrical web storage drum 19 for subsequent operations. The transport of web 2 may be effected by electric drive motor 23, providing positive rotation of web storage drum 19, for example, through an appropriate transmission comprising gears, drive shaft and step clutch (not shown) according to procedures well known in the art.

Alternatively, the web may be continuously processed to completion of the multicolor screen element by coating the first optical filter element containing surface of web 2 with an adhesive lacquer layer. Subsequent to substantial drying of the lacquer coating, the web may then be overcoated with a second photoresponsive dichromate sensitized gelatin layer.

The web is again transported through the same or a similar apparatus, as would be appropriate for use in continuous manufacturing operations, and is exposed to a scanning beam, the beam scanning the second photoresponsive layer through the web preferably at an angle approximately 90° to the direction of the previous scan. The filter lines or elements formed during the first exposure source serving to mask the radiation from those areas directly below the first set of lines.

The continuous web may then be processed, dyed, preferably with an acid dye of green coloration, and dried in accordance with the previously detailed description.

At this point in the process, the web, now containing a first and second series of optical filter elements, may be spooled on a storage cylinder for subsequent operations and/or employment.

In the alternative, a third series of optical filter elements may be immediately formulated by coating the external surface of the second optical filter element series with an adhesive lacquer and overcoating the lacquer coating with a third photoresponsive dichromate sensitized gelatin layer.

The web is again transported through the same or similar apparatus and exposed to continuous collimated nonscanning radiation incident on the external surface of the web. Exposure of the third photorespoisve layer is accomplished by radiation traversing through the film base and, masked by the previously-formed optical filter elements, thus provides formation of a third series of photoexposed areas, in apparent contiguous relationship to the first and second series of optical filter elements.

The continuous web may then be processed, dyed, preferably with an acid dye of blue color, dried and stored, in accordance with the aforementioned procedures, thus providing a third series of optical filter elements in screen relationship to the first- and second-formed filter element series with respect to actinic radiation traversing through the filter screen perpendicular to the axis of its main plane.

Optionally, the thus-formed multicolor screen may be overcoated with a protective polymeric composition, such as nitrocellulose, cellulose acetate, etc., prior to the external surface thereof having, for example, a panchromatically sensitized photographic emulsion or a diffusion transfer print-receiving layer applied thereto.

Referring again to the figure, scanning beam 7 may be provided by directing the output of radiation source 9, comprising a continuous wave laser, through an ultraviolet, second harmonic-generating crystal 20 and then through spectral filter 21 to a multifaceted prism 8 rotated by high speed electric motor 22.

Radiation source 9, for example, a 10 watt rated output continuous wave laser producing a monochromatic beam of approximately 6943 A., may be facused through a crystal 20 composed for instance, of ammonium dihydrogen phosphate or potassium dihydrogen phosphate for the purpose of generating a second harmonic beam of the fundamental laser output frequency in the ultraviolet region of the spectrum, e.g., 3472 A., i.e., that portion of the spectrum which is the most efficient in effecting hardening of the dichomate sensitized gelatin. The beam emerging from the crystal now containing a frequency component in the ultraviolet spectrum, as well as the original fundamental frequency, is passed through spectral filter 21 to eliminate the original frequency, and is focused on scanning multifaceted reflection prism 8.

The prism, rotated by motor 22, and mounted at an angle approximately 45° to the direction of the beam, interrupts and deflects the beam toward the web 2. As the beam impinges on either the extreme right or extreme left of one of the facets, depending upon the direction of rotation, the beam will be continuously reflected toward web 2 creating a line *a–b* of scan either to the right or left straight or diagonally across the web. As each facet rotates past the beam, the process will be repeated periodically causing repeated scanning at a rate dependent upon the number of reflecting facets of the prism and the rotational speed of the rotating motor. The distance between centers of the parallel exposed lines thus formed will be determined by the velocity of web transport in relation to the selected scan rate.

However, the rate at which the screen pattern is efficiciently constructed will in part depend upon the amount of energy required to sufficiently expose the selected areas of the photosensitive layer such that it may be completely processed or developed to color screen elements. In the preferred embodiment using the stated dichromated gelatin, ~0.6 joule/sq. in. is adequate.

A two-watt output continuous-wave laser system, emitting at a frequency in the near ultraviolet spectrum, has its beam focused to a spot 0.0006 inch in diameter. The cross-sectional area of the beam, $2.87 \times 10^{-7}$ square inch, has a power intensity equal to 7.1 megawatts per square inch.

With two watts of usable energy available and ~0.2 joule per square inch required to harden one-third of the photoresponsive layer's area for each color, approximately 10 square inches of web can be processed by this method in one second, or about 4 square feet per minute.

For a beam 0.0006 inch in diameter, ~550 lines per lines per lineal inch can be scanned in a 10 square inch area each second. This represents a total linear distance of ~460 feet covered by the focused spot each second, or ~27,600 feet per minute.

A ten-sided prism rotated at ~5300 r.p.m. will effect scanning of a six-inch wide strip of web eight feet long each minute. This corresponds to a beam deflection rate of less than ~1000 feet per second.

The position of the axis of the prism should be adjustable and the vertical component of the prism's axis should be positioned in such a way as to project the scanning beam onto the web at a 90° angle with the plane of the web. The horizontal component may be set at any angle up to 90° to the direction of motion of the web. Such angle controls the pattern of exposure as discussed above.

Where a laser system is chosen as the preferred radiation source, the invention is not limited to a particular make or model. There is an ever-increasing number of continuously operating lasers on the market including gas, liquid, crystal, glass and solid-state lasers including lasers adapted to directly emit coherent radiation in the ultraviolet range. Examples of continuously operating lasers are solid-state types, calcium fluoride doped with dysprosium, calcium tungstate doped with trivalent neodymium and ruby crystals; the gaseous types utilizing gases such as helium, neon, argon, crypton and zenon alone or in combination with other gases; and the semiconductor lasers such as the gallium arsenide diode. The choice of the particular continuous wave laser depends largely upon the frequency or color of the light desired and energy content of the beam required. The particular details of the laser light source structures and particular pumping or power sources are not given since these light sources are known in the art and discussion in detail would needlessly add to the description of the present invention.

As indicated above, it will be recognized that many other combinations of finely focused electromagnetic radiation sources, photoresponsive substances and processing steps may be used in accordance with the present invention. For example, the techniques of this invention have equal applicability to the manufacture of the stated color screens using photopolymerization systems. Similar steps and combinations of processes, as those shown above, i.e., exposure, dyeing, and washing, may be carried out with photoresponsive elements having a radiation-sensitive layer comprising a polymerizable monomer and a suitable photoinitiator for the polymerization reaction. Under the influence of actinic radiation, the photoinitiator becomes activated and induces the polymerization of the monomer. Treatment with a suitable solvent that dissolves, for example, the nonpolymerized material in the unexposed areas but not the polymer in the exposed areas will ultimately result in a series of color screen elements similar to those produced by the use of dicromated gelatin. With regard to such systems, reference is made to Light Sensitive Systems: Chemistry and Application of Nonsilver Halide Photographic Processes, Jaramir Kosar, 1965, and specifically to chapter 5.

In addition, the employment of photochemical dye formation and photochemical dye destruction systems in the present invention are also selectively available in accordance with the desires of the process operator.

The support or web may comprise any of the various types of ridged or flexible supports, for example, glass, paper, metal, polymeric films of both the synthetic type and those derived from naturally occurring products, etc. Especially suitable materials, however, comprise transparent synthetic polymers such as polymethacrylic acid, methyl and ethyl esters; vinyl chloride polymers; polyvinyl acetals; polyamides such as nylon; polyesters such as the polymeric films derived from ethylene glycol terephthalic acid; polymeric cellulose derivatives such as cellulose acetate, triacetate, nitrate, propionate, butyrate, acetate-butyrate, or acetate propionate; polycarbonates; and polystyrenes.

The line depth exposure of the photoresponsive layers in any of the systems detailed may be accurately controlled by suitably varying the intensity and/or time of the incident radiation.

It will be readily recognized that the instant processes are particularly adapted for use in the continuous photomechanical production of color screen elements by continuous processing of a travelling web according to the procedure detailed in explanation of the drawings. This continuous processing may be such as to provide completion of the multicolor screen element as a photographic film unit itself or, where desired, the processing may be interrupted at any stage for further operations at a subsequent time. The web itself may be continuous or discontinuous and may be continuously or intermittently processed, as desired.

The instant processes provide a number of distinct advantages over the processes heretofore employed for photomechanical production of multicolor screen elements. Among these advantages, mention may be made of the following as illustrative.

There is no problem of providing good contact between the web and the respective photoresponsive layers in that an integral unitary element may be employed, in contradistinction to conventional photomechanical processes which employ contact printing through an appropriate grating. The aforementioned unitary element also alleviates any problems of dirt or dust collecting on or between the exposure surface of the photoresponsive layer and a displaceable grating and, further, the unitary element also prevents slippage arising during continuous processing of same. Further advantages are obtained in that the instant processes avoid the parallax problems normally coincident with use of conventional contact or projection printing procedures.

For preparation of the preferred three-color additive screens, the exposed area of each photoresponsive layer comprises about one-third of the area of that layer. Exposure of the second photoresponsive coating is accomplished by incident radiation adapted to provide exposure of about one-third of the area of the second coating, the filter elements positioned most preferably substantially adjacent or in juxtaposition, respectively, to the first-formed chromatic filter elements. By proper choice of the photosensitive system or of the incident radiation, the first filter element may be opaque to subsequent exposure radiation. It may then be desirable to overlap the second set of images on the first set of elements, when such is desired to be parallel to the first set, without creating, for example, a black band due to the presence of superimposed areas of primary additive colors. Variables in the manufacture of the second set of elements will then cause less variation in the width of the second elements than would be encountered without this intentional overlap. Furthermore, intentional overlap can prevent small gaps between the first and second elements; these gaps, even if they are filled in with the third color, are disadvantageous in the photographic utilization of the color screen.

As previously stated, the color screen elements of the present invention are particularly adapted to be employed as elements of a photographic film unit. Specifically, the instant color screen elements, exhibiting a high degree of optical acuity, are particularly adapted for use in multicolor photographic processes, both of the conventional and diffusion transfer type, especially additive multicolor photographic processes.

Additive color photographic reproduction may be produced by exposing a photoresponsive material, preferably a photosensitive silver halide emulsion, through an additive color screen having filter media or screen elements, each of an individual additive color such as red, blue or green, and by viewing the resultant photographic, e.g., silver, image, subsequent to development, through the same or a similar screen element.

Although for photographic purposes, a photosensitive emulsion may be positioned on the rear side of a carrier retaining the color screen, for practical purposes it is preferred to position the emulsion on the color screen side of the element in order to maximize color saturation.

After exposure of the photoresponsive component of the photographic film unit, the resultant exposed element may be processed in the same manner as black-and-white photographic film is conventionally processed, without regard to the filter screen which is preferably spaced between the carrier and the emulsion component, especially where the filter screen is protected from processing composition contact by a protective polymeric composition.

Where positive photographic image formation is desired, that is, an image provided in terms of unexposed portions of the emulsion, reversal processing may be employed in its conventional manner, or a conventional "direct positive" emulsion may be employed, or the positive image may be provided by diffusion transfer processing.

In multicolor additive diffusion transfer processes, a latent image provided, as indicated above and contained in the exposed, photosensitive, preferably gelatinous, silver halide emulsion, is developed and, substantially contemporaneous with development, a soluble silver complex is obtained, for example, by reaction of a silver halide solvent with unexposed and undeveloped silver halide of the emulsion. The resultant soluble silver complex is, at least in part, transported in the direction of a suitable print-receiving element, and the silver of the complex precipitated in such element to provide the requisite positive image definition. The resultant transfer image may be viewed through the same, or a similar, additive color screen element which is suitably registered with the silver transfer image carried by the print-receiving layer.

For use in diffusion transfer multicolor additive photographic systems, the preferred film units have a panchromatically sensitized photographic emulsion coated on the external surface of the print-receiving layer, which is itself coated on a surface of the color screen, either with or without a stripping layer positioned intermediate the print-receiving layer and emulsion layer, to facilitate separation of the emulsion layer subsequent to transfer processing. Employing the instant preferred integrally constructed film unit allows exposure of the emulsion to be accomplished through the color screen, including through a transparent supporting member if present, and diffusion transfer formation of the positive silver image in the print-receiving layer contiguous the color screen employed during exposure. This embodiment accordingly obviates the necessity of registering a color screen with the resultant photographic image, for viewing purposes, in that the screen employed for exposing may also be employed for viewing and is automatically in register with the transfer image. The stripping layer itself may comprise a polymeric substance, such as hydroxyethyl cellulose, cellulose acetate hydrogen phthalate, etc.

Diffusion transfer additive photographic processes are disclosed in U.S. Pats. Nos. 2,614,926; 2,726,154; 2,944-894; and 2,992,103, issued Oct, 21, 1952; Dec. 6, 1955; July 12, 1960; and July 11, 1961, respectively.

The image-receiving layer may itself be comprised of one or more strata of a permeable substantially transparent material. As examples of image-receiving materials of such a nature, mention may be made of: regenerated cellulose; polyvinyl alcohol; partially hydrolyzed polyvinyl acetate; sodium alginate; cellulose ethers, such as methyl cellulose or other cellulose derivatives. such as sodium carboxymethyl cellulose or hydroxyethyl cellulose; proteins, such as gelatin or glue; carbohydrates, such as gums and starches; and mixtures of such materials, as for example, polyvinyl alcohol and gelatin, where they are compatible.

It will be recognized that the silver-receptive stratum should be so constituted as to provide an unusually vigorous elemental silver precipitating environment which causes the elemental silver deposited therein, in comparison with the amount of silver developed in the silver halide photosensitive layer, to possess very high covering power, that is, opacity per given mass of reduced silver.

Especially suitable as silver precipitating agents are the metallic sulfides and selenides, these terms being understood to include the selenosulfides, the polysulfides, and the polyselenides. Preferred in this group are the so-called "heavy metal sulfides." For best results it is preferred to employ sulfides whose solubility products in an aqueous medium at approximately 20° C. vary between $10^{-23}$ and $10^{-30}$, and especially the salts of zinc, cadmium and lead. Also suitable as precipitating agents are heavy metals such as silver, gold, platinum, palladium, and mercury, and in this category the noble metals are preferred and are generally provided in the matrix as collodial particles.

As disclosed in U.S. Pat. No. 2,698,244, issued Dec. 28, 1954, diffusion transfer processing may be effected by disposing a liquid processing composition in a rupturable container so positioned in regard to the appropriate surface of a silver halide emulsion that, upon compression with a spreader sheet, a substantially uniform layer of processing composition is distributed over the surface of said photosensitive emulsion, positioned distally from the image-receiving layer. The processing composition may be one of the film-forming processing compositions disclosed in U.S. Pat. No. 2,543,181, issued Feb. 27, 1951. It may comprise, for example, a developing agent such as hydroquinone, an alkali such as sodium hydroxide, a silver halide complexing agent such as sodium thiosulfate, and a high molecular weight film-forming thickening agent such as sodium carboxymethyl cellulose. All these materials are preferably in aqueous solution. These photographic agents are preferably contained in solution in the processing liquid prior to the application thereof, but they may be in part or wholly added to the processing composition as it is spread between the spreader sheet and the photosensitive silver halide emulsion, said agents being so located on or adjacent to the surface of one or both of said layers as to be dissolved by or otherwise interacted with the liquid agent when the latter wets said surface.

In carrying out the aforementioned transfer process, the photosensitive silver halide emulsion is photoexposed to form therein a latent image. A substantially uniform distribution of processing composition is distributed on the external surface of said emulsion, as for example, according to the previously-described procedure. Processing composition reagents permeate into the photosensitive emulsion, developing the latent image contained therein according to the point-to-point degree of exposure of said emulsion. Substantially contemporaneous with the development of the latent image, an imagewise distribution of soluble silver complex is formed from unexposed and unreduced silver halide within said emulsion. At least part of said silver complex, solubilized, is transferred, by imbibition, to the print-receiving stratum. The transferred silver complex is reacted to provide a positive, reversed image of the latent image. Subsequent to formation of the positive image in the image-receiving layer, dissociation of said layer from the emulsion layer may be effected.

It must be noted that abrasion-resistant properties may be provided to the image-receiving layer, by the inclusion therein of deacetylated chitin, as disclosed in U.S. Pat. No. 3,087,815, which alleviates the necessity of subsequently overcoating the external surface of image-receiving layer with a transparent abrasion-resistant water-insoluble plastic, to prevent laceration and resultant degradation of the positive image, subsequent to removal of the emulsion from contact therewith.

The concentration of deacetylated chitin disposed in the image-receiving layer may be varied over a wide range according to the degree of rigidity desired, during and subsequent to processing, and the thickness and character of the image-receiving stratum employed.

Other materials may be substituted for those used in the foregoing photographic process and the proportions may be varied to an appreciable extent. For example, the film-forming material in the processing composition which imparts the desired viscosity to the latter may be any of the high molecular weight polymers which are stable to alkali and which are soluble in aqueous alkaline solutions. For example, such other plastics as hydroxyethyl cellulose, polyvinyl alcohol, and the sodium salts of polymethacrylic acid and polyacrylic acid may be used. The plastic is preferably contained in the processing composition in sufficient quantity to impart to the composition a viscosity in excess of 1,000 centipoises at a temperature of approximately 20° C. Preferably, the viscosity of the processing composition is of the order of 1,000 to 200,000 centipoises.

Other developing agents may be used, for example, one of the following: p-aminophenol hydrochloric bromohydroquinone; chlorohydroquinone; diaminophenol hydrochloride; diaminophenol dihydrochloride; toluhydroquinone; monomethyl-p-aminophenol sulfate; a mixture consisting by weight of ½ hydroquinone and ½ p-hydroxyphenylaminoacetic acid; and a mixture consisting by weight of ¼ hydroquinone and ¾ p-hydroxyphenylaminoacetic acid.

To form the soluble silver complex, such other complex-forming substances as sodium thiocyanate, ammonium thiocyanate and ammonia may be employed.

The preferred silver halide type photographic emulsion, employed for the production of the photographic film unit, may be prepared by reacting a water-soluble silver salt, such as silver nitrate, with at least one water soluble halide, such as ammonium, potassium or sodium bromide, preferably together with a corresponding iodide, in an aqueous solution of a peptizing agent such as a colloidal gelatin solution; digesting the dispersion at an elevated temperature, to provide increased crystal growth; washing the resultant dispersion to remove undesirable reaction products and residual water-soluble salts by chilling the dispersion, noodling the set dispersion, and washing the noodles with cold water, or, alternatively, employing any of the various floc systems, or procedures, adapted to effect removal of undesired components, for example, the procedures described in U.S. Pats. Nos. 2,614,928; 2,614,929; 2,728,662, and the like; after-ripening the dispersion at an elevated temperature in combination with the addition of gelatin and various adjuncts, for example, chemical sensitizing agents and the like; all according to the traditional procedures of the art, as described in Neblette, C. B. Photography—Its Materials and Processes, 6th Ed., 1962.

Panchromatic optical sensitization of the emulsion's silver halide crystals may then be accomplished by contact of the emulsion composition with an effective concentration of panchromatic optical sensitizing dye or dyes; all according to the traditional procedures of the art, or described in Hamer, F. M, The Organic Dyes and Related Compounds.

Subsequent to optical sensitization, any further desired additives, such as coating aids and the like, may be incorporated in the emulsion and the mixture coated and processed according to the conventional procedures known in the art.

The photoresponsive material of the photographic emulsion will, as previously described, preferably comprise a crystal of a compound of silver, for example, one or more of the silver halides, such as silver chloride, silver iodide, silver bromide, or mixed silver halides, such as silver chlorobromide or silver iodobromide, of varying halide ratios and varying silver concentrations.

As to the binder for the photoresponsive material, the aforementioned gelatin may be, in whole or in part, replaced with some other natural and/or synthetic colloid material such as albumin; casein; or zein; or resins as a cellulose derivative, as described in U.S. Pats. Nos. 2,322,085 and 2,327,808; polyacrylamides, as described in U.S. Pat. No. 2,541,474; vinyl polymers such as described in U.S. Pats. Nos. 2,253,078; 2,276,322; 2,276,323; 2,281,703; 2,310,223; 2,311,058; 2,311,059; 2,414,208; 2,461,023; 2,484,456; 2,538,257; 2,579,016; 2,614,931; 2,624,674; 2,632,704; 2,262,420; 2,678,884; 2,691,582; 2,725,296; 2,753,264; and the like.

It may be found that after the dyeing of layers of monochromatic filter elements, there may tend to remain, even after rinsing, a molecular film of the dye over the areas previously stripped. Under these circumstances, it may be preferred to forcibly separate the excess dye from the unexposed areas and this may be accomplished by directing vigorous air blasts in the direction parallel to the long side of the particular areas being operated on.

It is desirable of course that the adhesion of the carrier, the three monochromatic filter layers, etc., should be very secure so that the individual structures will remain bonded during the manufacture and processing of the finished product, and further that there will be subsequently no mechanical separation of the various layers which will create optical and mechanical difficulties.

Under these circumstances, it is desirable that adhesive or lacquer layers be interposed between respective layers and filter elements. The adhesive layer selected should be on which does not deleteriously interfere with the transparency of the final product, and yet provides sufficient adhesive capacity so as to allow vigorous treatment of the film unit during and subsequent to its production. The aforementioned nitrocellulose has been found to be a highly desirable bonding agent, although other adhesives known in the art for the instant purposes may be employed, where desired.

The bond obtained throughout the entire unit by this invention should be sufficient to withstand the vigorous treatment such as air blasting and heat to which the unit may be exposed. Moreover, there should be no local separation of the various layers during mechanical treatments that would cause spots, particularly on magnification.

Various colors and numbers of colors may be used in this invention but the preferred system is a tri-color arrangement of the three primary colors, red, green and blue. A four-color system such as red, green, violet-blue and orange-yellow could be used also, by a sequential series of exposures effecting approximately one-fourth of the respective photo-responsive area providing formation of optical filter elements comprising a single selected color, followed by, for example, a fourth overall exposure, in accordance with the teachings of the instant disclosure. Furthermore, it will be recognized that, in accordance with the instant disclosure, a plurality of chromatic filter element series may be provided, the number of series being solely determined by the optical parameters of the resultant color screen desired.

In the description herein, each color series of filter elements has been described as covering that part of the total area in proportion to the total number of colors used, i.e., in the tri-color system, each color occupies one-third of the total area. This may vary quite widely before having a noticeable effect to the observer and, in fact, may be compensated by changing the intensity of the colors. In actual practice, if one dye is of greater intensity than the others, a deliberate compensation may be made by reducing the total relative area of the intense color. The aspect of relative areas is well known in the art so that when relative areas are used in this application, it is intended to include the variances which the art would recognize as being successful.

Although acidic or basic dyes may be used in the present process, it is desirable to use acidic dyes which are generally considered to be more durable and to possess better tone. Various suitable wetting agents may also be added to the dye solution to further insure a thorough penetration of the dye into the desired areas.

As examples of dyes for effecting coloration of the optical filter units, mention may be made of acid red dyes such as Acid Reds C.I. 1 and C.I. 34, which may be mixed with Direct Red C.I. 24, Acid Yellow C.I. 36 or Direct Yellow C.I. 4; acid green dyes such as Acid Green Pina (trade name of Farbwerke Hoechst Ag., Frankfurt, Germany, for a triphenyl methane dye), which may be mixed with the above yellow dyes; and acid blue dyes such as Acid Blue C.I. 27.

Since certain changes may be made in the above product, process and apparatus without departing from the scope of the invention herein involved, it is intended that all matter contained in the above description shall be interpreted as illustrative and not in a limiting sense.

What is claimed is:

1. In a process for the preparation of a multicolor screen comprising a plurality of chromatic filter elements, in screen relationship, adapted to selectively filter incident electromagnetic radiation which comprises, in combination, the steps of coating on a surface of a support a plurality of photoresponsive layers; selectively exposing each of said photoresponsive layers to electromagnetic radiation actinic to said layer to provide a plurality of discrete exposed areas, in screen relationship; and dyeing each of said layers as a function of its point-to-point degree of exposure to provide a series of chromatic filter elements adapted to filter selected wavelengths of incident electromagnetic radiations; the improvement which comprises selectively exposing at least one of said plurality of layers by periodically traversing said layer with a substantially coherent beam of electromagnetic radiation actinic to said layer, said layer and said beam moving substantially transversely relative to one another in order to provide a plurality of exposed areas separated from and substantially parallel to each other.

2. The process as defined in claim 1 wherein at least one of said plurality of layers is selectively exposed and dyed prior to deposition of one other of said layers.

3. The process as defined in claim 2 wherein said support comprises a transparent support, at least two of said sequential selective exposures comprise periodically traversing a layer with a beam of electromagnetic radiation actinic to said layer and the selective exposure of the terminal layer is effected by diffuse electromagnetic radiation actinic to said layer passing through said support and masked by the previously-formed series of chromatic filter elements.

4. The process as defined in claim 3 wherein said second of said two sequential selective exposures is effected by periodically traversing said layer in substantial juxtaposition to the chromatic filter elements comprising the previously-formed series of chromatic filter elements with a beam of electromagnetic radiation actinic to said layer.

5. The process as defined in claim 3 wherein said second of said two sequential selective exposures is effected by periodically traversing said layer with a beam of electromagnetic radiation actinic to said layer passing through said support and masked by the previously-formed series of chromatic filter elements.

6. The process as defined in claim 5 wherein said beam of electromagnetic radiation traverses said layer at an angle to the longitudinal axes of said previously-formed series of chromatic filter elements.

7. The process as defined in claim 6 wherein said angle is about 90°.

8. The process as defined in claim 2 wherein said layers comprise a photoresist.

9. The process as defined in claim 8 wherein said photoresist is maximally responsive to ultraviolet electromagnetic radiation.

10. The process as defined in claim 9 wherein said photoresist is dichromated gelatin.

11. The process as defined in claim 1 wherein at least two of said photoresponsive layers is sensitive to different regions of the electromagnetic radiation spectrum.

12. The process as defined in claim 11 wherein at least two of said photoresponsive layers sensitive to different regions of the spectrum are each selectively exposed simultaneously to electromagnetic radiation actinic to said layers.

13. The process as defined in claim 12 wherein each of said selectively exposed photoresponsive layers is simultaneously dyed a difference color to simultaneously provide a plurality of chromatic filter element series.

14. The process as defined in claim 1 wherein said electromagnetic radiation is provided by a laser.

15. A process as defined in claim 1, wherein said plurality of photoresponsive layers comprises three photoresponsive layers and each exposure step exposes approximately one-third of the area of any given portion of each photoresponsive layer exposed.

16. The process as defined in claim 15 wherein said plurality of chromatic filter element series comprises a series of chromatic filter elements dyed red, a series of chromatic filter elements dyed green and a series of chromatic filter elements dyed blue.

17. A process as defined in claim 1, including the step of coating an abrasion resistant polymeric layer on the external surface of said chromatic filter elements.

18. A process as defined in claim 1, including the step of coating a photographic emulsion layer on the external surface of said chromatic filter elements.

19. A process as defined in claim 1, including the step of coating a diffusion transfer print-receiving layer on the external surface of said chromatic filter elements.

20. A process as defined in claim 19, including the step of coating a panchromatic photographic emulsion layer on the external surface of said diffusion transfer print-receiving layer.

21. A process as defined in claim 1, wherein an adhesive layer is interposed between each of said photoresponsive layers and the layer immediately preceding.

References Cited

UNITED STATES PATENTS

| | | | |
|---|---|---|---|
| 2,478,555 | 8/1949 | Yule | 96—116 |
| 2,818,465 | 12/1957 | Brink | 96—116 |
| 3,284,208 | 11/1966 | Land | 96—118 |

NORMAN G. TORCHIN, Primary Examiner

J. R. HIGHTOWER, Assistant Examiner

U.S. Cl. X.R.

96—80, 118